P. KESTNER.
PROCESS OF EVAPORATION AND APPARATUS THEREFOR.
APPLICATION FILED AUG. 22, 1911.
1,028,737.
Patented June 4, 1912.
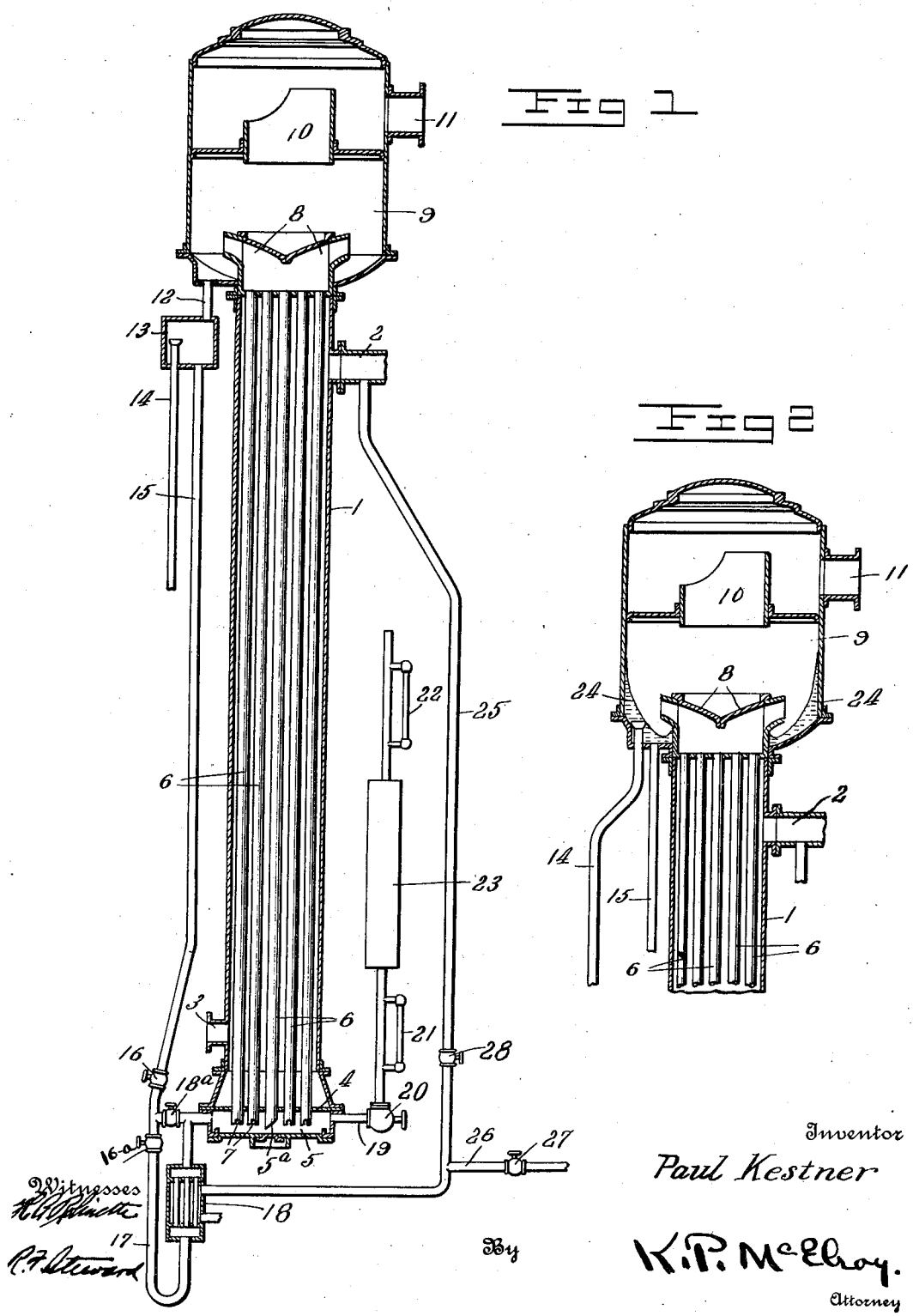
Witnesses
Inventor
Paul Kestner
By K. P. McElroy.
Attorney

UNITED STATES PATENT OFFICE.

PAUL KESTNER, OF LILLE, FRANCE, ASSIGNOR TO KESTNER EVAPORATOR COMPANY, OF PHILADELPHIA, PENNSYLVANIA, A CORPORATION OF PENNSYLVANIA.

PROCESS OF EVAPORATION AND APPARATUS THEREFOR.

1,028,737.  Specification of Letters Patent.  Patented June 4, 1912.

Application filed August 22, 1911. Serial No. 645,426.

*To all whom it may concern:*

Be it known that I, PAUL KESTNER, a citizen of the Republic of France, residing at Lille, Department of Nord, France, have invented certain new and useful Improvements in Processes of Evaporation and Apparatus Therefor, of which the following is a specification.

This invention relates to processes of evaporation and apparatus therefor; and it comprises a method of evaporation wherein liquid is rapidly evaporated as a forced film which is caused to ascend swiftly through evaporating tubes by contact with a stream of vapor, is collected at the top of the tubes as a sort of "dominant pool" from which a regulated and adjusted variable portion is constantly being returned to add to and enhance the volume of inflowing fresh liquid and control the amount of liquid temporarily in the apparatus while the residual excess of liquid accumulating in said pool is taken to a point of discharge; and it also comprises an evaporator of the ascending film type provided with a plurality of relatively long vertical tubes in a heating casing, with basal feed means adapted to allow the formation of a climbing film in such tubes, with means for separating liquid and vapor in a surmounting hood casing and with means for allowing the accumulation of a body of concentrated liquid, said means being provided with a valved pipe leading back to the feed means and with an overflow pipe leading to a point of discharge; all as more fully hereinafter set forth and as claimed.

In the evaporation of liquids it is found that, other things being equal, the heat-transmitting efficiency, that is, the evaporating efficiency, of a heating surface depends largely upon the movement thereover of the liquid to be heated, or evaporated, the more rapid the movement of the liquid the greater being the efficiency. The desirability of movement and other reasons have led to the general introduction of filming evaporators in which the liquid is sent over heated surfaces as a traveling film, or series of films; and the recognition of the still greater desirability of rapid movement has brought into use the climbing film type of evaporators in which relatively long heated vertical tubes are basally fed with liquid, or with liquid and vapor (it being advantageous to use both) in such a manner that the liquid ascends through the tubes as an annular film carried onward and upward by the propulsive influence of a central core or stream of onrushing vapor. As will be readily apparent, since a given volume of liquid on evaporation becomes a very much greater volume of vapor, with evaporation going on in a relatively long vertical tube the forward rush of vapor is, or may be, relatively violent and particularly where, as is usually the case, the vapor is withdrawn by exhausting or vacuum producing means. This rush of vapor may be relied on to carry the liquid upward and forward as a forced film, the "climbing film"; a traveling annulus of liquid passing over and thoroughly wetting the interior surfaces of the heating tubes. Its movement forward is positive, since it is caused by the propulsive effect of the swift vapor current, and is very rapid; much more rapid than can be attained where gravity alone is relied upon to cause travel as in older forms of evaporators. And with this rapidity of movement is of course correlated a corresponding efficiency of heat transfer; and a correspondingly rapid evaporation. The rapid movement causes a rapid evaporation, giving a rapid and copious evolution of vapors which, in the narrow tube, in turn causes the rapid movement of liquid. This rapidity of movement and of evaporation may lead to difficulties in practical operation. With a plurality of evaporating tubes operating in parallel and fed by a common basal feed chamber, as in the usual types of apparatus, some tubes, unless special precautions are taken, may take the bulk of the liquid, transmitting liquid in thicker layers or annuli than are desirable while other tubes may run dry, or with too little liquid. This may be largely obviated by proper distribution of incoming liquid in the feed chamber, and by allowing self-evaporation in the chamber to form a cushion of steam or vapor surmounting the layer of liquid while providing the tubes with laterally presented orifices, (as by beveling or slotting the ends), which shall simultaneously tap both the steam layer and the liquid layer, giving a simultaneous even feed of both to each tube. But these expedients while providing for a uniform distribution of liquid among the several tubes, giving each its proper proportion of the incoming liquid, do not alone suffice in the event where the amount of such incoming liquid in a rapidly operating effect is not enough to give a good and efficient thickness of layer or film over the whole evaporating surface of each tube from bottom to top; something which is particularly apt to happen in the case of a final effect in a multiple effect arrangement.

For a number of reasons, all the effects in a multiple effect apparatus are ordinarily of about the same dimensions; and present about the same area of heating and evaporating surface to the liquid passing therethrough. Now as the liquid travels serially through the successive effects and is concentrated as it goes, it is obvious that a larger volume of liquid is presented to the heating surfaces of the first effect than to those of the last; and the feed of liquid which may give an efficient thickness of film in the first effect may not in the last. Or in any effect, with rapid operation the rate of inflow of liquid which at the bottom of the tubes will give an annulus of efficient thickness, the lessened volume of liquid as it nears the top of the tube may cause the annulus to become converted into discrete streams or runlets, leaving portions of the tube surfaces uncovered and consequently not functioning in evaporation. These difficulties do not occur, or do not occur to any such extent, in film evaporators in which the forward feed of the film is not forced but occurs naturally, as by gravitation; but they do obtain more particularly with the forced rapid forward feed of the climbing films.

In the present invention, I obviate the noted difficulties and obtain certain new advantages in operation by making the amount of liquid in the climbing film effect, considered as a whole, at any given time independent of the temporary fluctuations of the feed or of the evaporation. To this end I provide what may be termed a "dominant pool" or accumulation of concentrated liquid near the outlet from the system; and from this accumulation I constantly withdraw adjusted and regulated but variable proportions of liquid which I return to the base of the effect to mingle with incoming fresh liquid, the excess of liquid over that necessary to form the accumulation and provide the return being of course sent to discharge as finished liquid; finished, that is, so far as this particular effect is concerned though it may of course go to another effect in series. In so operating, the effect is always being fed from a source of fresh liquid and to this fresh liquid is added a bulk-giving adjusted proportion of liquid which has already made a passage through the apparatus to give a total quantity of liquid from the two sources which will uniformly cover the heating surfaces throughout to the thickness desired. This allows me to force the forward feed of the film to make it travel as rapidly as may be desired and to force the evaporation without fear in so doing of causing inefficient distribution among the several tubes or inefficient distribution of good films throughout the extent of the inner or heating surface of the tubes.

The provision of an accumulation of concentrated liquid which may be utilized as a dominant pool to aid in averaging out temporary fluctuations of feed and operation, the operator drawing back more or less as temporary exigencies may demand, makes the operation of the apparatus as a whole much more flexible and controllable.

The accumulation may be contained within the apparatus itself, or, and much more desirably, may be contained in a special chamber. In the operation of the climbing film type of evaporator, it is customary to cause the liquid and vapor, which emerge jointly from the tops of the tubes with considerable speed and force, to be directed tangentially against the curved inner surface of a surmounting vapor hood to form a whirling wall of liquid from which the vapor separates by centrifugal action. This whirling wall naturally slopes laterally and inwardly at the bottom; and the discharge pipe may be so arranged as to give an overflow into it at a point where the lateral sloping continuation has the desired depth to give the desired accumulation of liquid while the valved pipe leading back to the feed chamber may tap the hood chamber at the bottom of the pool. It is, however, much better to discharge all the liquid from the hood into a separate quieting chamber wherein the pool is formed and to connect the overflow pipe and the valved return pipe to this chamber. In the hood the depth of the layer of liquid accumulating depends not only upon the amount of liquid but upon the speed of whirl along the outer wall; and this speed depends upon the temporary speed with which liquid and vapor are being discharged from the evaporating tubes.

The tube leading back to the feed chamber should be valved with a readily adjustable valve permitting quick, easy and close adjustment according to the temporary needs of the apparatus. It may usefully be provided with a heating jacket; and in such event should have a depending loop to facilitate circulation. This jacket may receive steam or may receive vapor from a prior effect. It is also desirable to provide the feed pipe bringing in fresh liquid with a heating jacket, with a reserve tank and with a feed regulating valve. By regulating the valves in the two pipes any relative proportions of preconcentrated and of fresh liquid may be admixed while the provision of the reserve tank make the fresh liquid supply in a measure independent of the fluctuations in operation of a preceding effect.

In the accompanying illustration I have shown more or less diagrammatically, apparatus within the present invention and adapted for use in the stated process.

In this showing, Figure 1 is a view partly in section and partly in elevation, of a single effect; and Fig. 2 is a fragmentary similar view of a modified form.

In Fig. 1, element 1 is a heating casing provided with vapor inlet 2 and outlet 3. At the bottom of this casing cross header 4 separates it from feed chamber 5. Within this feed chamber depend the ends of a plurality of vertical evaporating tubes 6, each being relatively long and narrow. As shown, these tubes are provided with depending prolongations 7 provided with slotted or beveled (see 5$^a$) ends to give laterally presented orifices which can tap both the steam space and the liquid space within the feed chamber. At their upper ends, the vertical evaporating tubes discharge through conduits 8 having tangentially presented outlets or ports. These outlets are within surmounting hood or vapor separating casing 9, which is advantageously of a generally circular section. Near its top, the hood casing is provided with bat-wing separator 10 causing the vapors to take a circuitous passage to vapor outlet 11. The violent streams of vapor and liquid coming from the evaporating tubes are tangentially or angularly discharged against the inner wall of the hood in such a manner as to make a whirling wall of liquid from which the vapor separates positively, bubbles being broken, etc. The whirling wall of liquid will have a centrally directed lateral slope which may reach nearly to or beyond the tangential outlets described. Tapping this body of liquid is a freely open outlet 12 leading the liquid to an overflow chamber 13. As shown, take-away pipe 14 extends within this chamber to a sufficient height to give an overflow discharge. This take-away pipe may lead to another effect or to a syrup tank, this depending upon the arrangement of the effect, whether it be an intermediate effect in a series or the final effect. Tapping the bottom of this overflow chamber is a conduit 15 having valves 16 and 16$^a$. As shown, this conduit has a depending loop 17 extending to the feed chamber and a heating jacket 18 which may be supplied with vapor from a preceding effect or with steam as the case may be. There may be a direct connection with the feed chamber through a valved pipe 18$^a$. Fresh liquid is brought to the feed chamber by 19, coming from a source of juice or from a previous effect, as the case may be. This conduit is valved at 20 and is provided with gage glasses 21 and 22. Intermediate the gage glasses is shown a reserve tank 23 which may be of any desired construction. The elements in Fig. 2 are about the same save that the separate overflow tank is dispensed with and the overflow pipe is continued upwardly within the hood casing while the return pipe taps the bottom of this casing. Diagrammatically shown liquid layer 24 gives the dominant pool.

As shown, 19 and 15 feed into opposite sides of the supply chamber but they may enter at the same side. Any suitable deflecting means (not shown) may be used in the supply chamber to distribute inflowing liquid evenly in such chamber.

The operation of the device of Fig. 1 is obvious from the foregoing.

Liquid from a suitable source of supply passes into reserve tank 23 whence adjusted amounts of the same may be admitted by opening valve 20 into feed chamber 5 through 19. At the same time, adjusted proportions of liquid are returned from the overflow casing by opening valve 16. Heating jacket 18 allows the returned liquid to be heated. In devices of this character, it is useful to have the liquid enter the feed chamber at a higher temperature than that which prevails in the effect; that is, than corresponds to the vacuum or pressure in such effect. In so doing, the entering liquid undergoes self-evaporation with the formation of a steam cushion and with the heating tubes having laterally presented orifices at their base, both steam and liquid may be simultaneously fed upward through the tube. This much enhances the regularity of operation. As the liquid coming from the hood chamber is at the effect temperature, it does not undergo self-evaporation in entering the feed chamber. For this reason, the heating jacket 18 is useful. With the heating jacket in use, depending loop 17 is useful as promoting circulation. It is difficult to induce liquid to flow downward through a heating jacket. The overflow pipe 14 passing upward some distance into 13 insures that a substantial pool or body of liquid shall remain in 13 at all times. Whatever the demands on this concentrated liquid for returning purposes, caused by the opening of valve 16, there will always be a substantial body of liquid in 13 from which to tap.

By opening or closing valve 16 any adjusted proportion of liquid from the hood may be returned to the feed chamber at the base of the effect, while by similar control of 20 adjusted proportions of fresh liquid can be admixed therewith. The reserve chamber 23 allows a flexible control of the amount of fresh liquid introduced; a control which is not possible where the inlet for a succeeding effect communicates directly with the outlet of a preceding effect.

The heating jacket may be supplied through valved pipe 25 with the same vapor or steam used in heating the effect, or with other vapor and steam from pipe 26, valved at 27.

What I claim is:—

1. The process of evaporating liquids which comprises passing an inflowing body of liquid upward through a heated tube as an ascending film, diverting a controlled amount of the liquid emerging from the top of the tube and admixing the diverted liquid with liquid from another source to form said body.

2. The process of evaporating liquids which comprises passing an inflowing body of liquid upward through a heated tube as an ascending film, diverting a controlled amount of the liquid emerging from the top of the tube and admixing the diverted liquid with liquid from another source to form said body, the proportions of liquid so admixed being varied from time to time to correspond with variations in evaporating conditions within said tube.

3. The process of evaporating liquids which comprises passing an inflowing body of liquid upward through a heated tube as an ascending film, collecting the liquid emerging from the top of the tube as a pool or body overflowing to a point of discharge while diverting a controlled amount and admixing the diverted liquid with liquid from another source to form said inflowing body.

4. The process of evaporating liquids which comprises passing an inflowing body of liquid upward through a heated tube as an ascending film, collecting the liquid emerging from the top of the tube as a comparatively quiescent pool or body overflowing to a point of discharge while diverting a controlled amount and admixing the diverted liquid with liquid from another source to form said inflowing body.

5. The process of evaporating liquid which comprises passing an inflowing body of liquid upward through a heated tube as an ascending film, collecting the liquid emerging from the top of the tube and diverting a controlled amount of it, reheating the diverted liquid and admixing it with other liquid to form said inflowing body.

6. In the operation of an ascending film evaporator, the process which comprises accumulating the liquid discharged from the top of evaporator as a body, collecting another liquid as a body and feeding the base of said evaporator with controlled proportions of the liquids of both bodies.

7. In an evaporating apparatus of the tubular ascending film type, means for forming a pool or body of the liquid discharged at the top of the tubes, overflow discharge means and a valved pipe connection leading back from said pool to the base of the evaporator.

8. In an evaporating apparatus of the tubular ascending film type, means for forming a pool or body of the liquid discharged at the top of the tubes, overflow discharge means and a valved pipe connection leading back from said pool to the base of the evaporator, said pipe connection including heating means.

9. An evaporating apparatus of the climbing film type, comprising a plurality of vertical evaporating tubes in a heating chamber, a hood surmounting such tubes, means for separating liquid and vapor and forming a body of liquid therein, a separate liquid receiving chamber in liquid communication with said body, an overflow conduit leading away from the liquid-receiving chamber, a supply chamber at the base of said tubes, means for introducing fresh liquid to the same, and a valved connection between said separate liquid-receiving chamber and said supply chamber.

In testimony whereof, I affix my signature in the presence of two subscribing witnesses.

PAUL KESTNER.

Witnesses:
LEÓN PECKEL,
VICTOR KLAUSZMANN.